US008972090B2

(12) United States Patent
Weslati et al.

(10) Patent No.: US 8,972,090 B2
(45) Date of Patent: Mar. 3, 2015

(54) PREDICTIVE POWERTRAIN CONTROL USING POWERTRAIN HISTORY AND GPS DATA

(71) Applicants: Feisel Weslati, Troy, MI (US); Ashish A Krupadanam, Rochester Hills, MI (US)

(72) Inventors: Feisel Weslati, Troy, MI (US); Ashish A Krupadanam, Rochester Hills, MI (US)

(73) Assignee: Chrysler Group LLC, Auburn Hills, MI (US)

(*) Notice: Subject to any disclaimer, the term of this patent is extended or adjusted under 35 U.S.C. 154(b) by 12 days.

(21) Appl. No.: 13/778,471

(22) Filed: Feb. 27, 2013

(65) Prior Publication Data

US 2013/0268150 A1 Oct. 10, 2013

Related U.S. Application Data

(60) Provisional application No. 61/619,968, filed on Apr. 4, 2012.

(51) Int. Cl.
| | | |
|---|---|---|
| *B60L 9/00* | (2006.01) | |
| *G06F 17/00* | (2006.01) | |
| *B60W 10/06* | (2006.01) | |
| *B60W 10/08* | (2006.01) | |
| *B60W 20/00* | (2006.01) | |
| *B60W 10/11* | (2012.01) | |
| *B60W 10/26* | (2006.01) | |
| *B60W 50/00* | (2006.01) | |

(52) U.S. Cl.
CPC ............... *G06F 17/00* (2013.01); *B60W 10/06* (2013.01); *B60W 10/08* (2013.01); *B60W 20/108* (2013.01); *B60W 10/11* (2013.01); *B60W 10/26* (2013.01); *B60W 20/104* (2013.01); *Y10S 903/93* (2013.01); *B60W 2050/0089* (2013.01); *B60W 2530/14* (2013.01); *B60W 2550/402* (2013.01)
USPC ............................................ 701/22; 903/930

(58) Field of Classification Search
CPC ..... B60W 20/00; B60W 10/08; B60W 10/06; B60W 2510/244; B60W 10/26
USPC .......................... 701/22, 1, 51, 400; 903/930
See application file for complete search history.

(56) References Cited

U.S. PATENT DOCUMENTS

| | | | | |
|---|---|---|---|---|
| 5,790,976 | A * | 8/1998 | Boll et al. ................... | 455/456.5 |
| 2004/0083044 | A1* | 4/2004 | Akiyama et al. ............... | 701/48 |
| 2011/0202216 | A1* | 8/2011 | Thai-Tang et al. .............. | 701/22 |
| 2011/0246068 | A1* | 10/2011 | Luo et al. ....................... | 701/214 |
| 2012/0035795 | A1* | 2/2012 | Yu et al. .......................... | 701/22 |
| 2012/0136574 | A1* | 5/2012 | Kobayashi et al. ........... | 701/533 |
| 2012/0142397 | A1* | 6/2012 | Jordan et al. ............... | 455/556.1 |

* cited by examiner

*Primary Examiner* — Helal A Algahaim
*Assistant Examiner* — Shardul Patel
(74) *Attorney, Agent, or Firm* — Ralph E. Smith

(57) ABSTRACT

A method and powertrain apparatus that predicts a route of travel for a vehicle and uses historical powertrain loads and speeds for the predicted route of travel to optimize at least one powertrain operation for the vehicle.

9 Claims, 2 Drawing Sheets

PREDICTIVE POWERTRAIN CONTROL USING POWERTRAIN HISTORY AND GPS DATA

CROSS-REFERENCE TO RELATED APPLICATION

This application claims the benefit of U.S. Provisional Ser. No. 61/619,968, filed Apr. 4, 2012.

GOVERNMENT INTEREST

This invention was made, at least in part, under U.S. Government, Department of Energy, Contract No. DE-EE0002720. The Government may have rights in this invention.

FIELD

The present disclosure relates to vehicle powertrain control and, more specifically, to predictive vehicle powertrain control based on powertrain history and GPS data.

BACKGROUND

Motorized vehicles include a powertrain operable to propel the vehicle and power the onboard vehicle electronics. The powertrain typically includes an engine that powers the final drive system through a multi-speed transmission. Many of today's conventional, gas-powered vehicles are powered by an internal combustion (IC) engine.

Hybrid vehicles have been developed and continue to be developed. Conventional hybrid electric vehicles (HEVs) combine internal combustion engines with electric propulsion systems to achieve better fuel economy than non-hybrid vehicles. Plugin hybrid electric vehicles (PHEVs) share the characteristics of both conventional hybrid electric vehicles and all-electric vehicles by using rechargeable batteries that can be restored to full charge by connecting (e.g. via a plug) to an external electric power source.

Despite the introduction of hybrid vehicles and improved conventional gas powered vehicles, the automotive industry is continually faced with the challenge of improving fuel economy and reducing emissions without sacrificing vehicle performance. As mentioned above, there are many different types of vehicles in existence today with numerous others being developed for the future. Accordingly, there is a need and desire for a technique for improving fuel economy and reducing emissions without sacrificing vehicle performance that will work with many different types of vehicles.

SUMMARY

In one form, the present disclosure provides a method of controlling a vehicle powertrain. The method comprises determining a present location of the vehicle; predicting a route of travel for the vehicle from the present location based on the current day and time; retrieving historical powertrain loads and speeds for the predicted route of travel; and optimizing a powertrain operation based on the retrieved historical powertrain loads and speeds.

The present disclosure also provides a powertrain apparatus for a vehicle. The apparatus comprises a controller adapted to determine a present location of the vehicle; predict a route of travel for the vehicle from the present location based on the current day and time; retrieve historical powertrain loads and speeds for the predicted route of travel; and optimize a powertrain operation based on the retrieved historical powertrain loads and speeds.

In one embodiment, wherein the optimized powertrain operation comprises one of shift scheduling and battery control.

In another embodiment, predicting the route of travel comprises searching recorded history to determine if the present location is associated with another historical location that is typically traveled after the present location for a matching day and time; and adding the another historical location to the predicted route of travel if it is determined that the present location is associated with another historical location that is typically traveled after the present location for a matching day and time. In another embodiment, the other historical location is not added if additional information indicates that a different location should be added to the predicted route. The additional information may be input from a vehicle to vehicle data source or a vehicle to infrastructure data source.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

According to the principles disclosed herein, and as discussed below, predictive control of the powertrain of various conventional and hybrid vehicles can be performed to improve fuel economy and emissions using predicted vehicle usage based on the powertrain's operational history and GPS information. According to the principles disclosed herein, powertrain history including speeds and loads, along with present and past GPS location are used to predict future loads and speeds for the current trip. In addition, a navigational system, map database and driver inputs will not be required for the method and system disclosed herein to make a prediction of the driver's route and intended destination.

Predicting the loads and speeds of the vehicle for the duration of a trip allows shift scheduling to be performed on conventional vehicles and allows transmission and battery control to be performed on HEVs and PHEVs. For example, predicted trip load and grades can be used to optimize battery charging and discharging locations along the trip. Moreover, the modes of transmission operation (e.g., in electrically variable transmissions) or gear ratio selection on conventional and other HEVs can be optimized. For PHEVs, which are generally designed to operate in two modes (a charge depleting mode or a charge sustaining mode), prediction of battery charging locations can be used to change battery discharging strategy (in the charge depleting mode) to be more or less aggressive.

As will be shown below, GPS and powertrain speeds and loads along the route traveled are stored with a time stamp in a non-volatile memory. When a driver travels on the path again, and a similar day and time match is found in the stored history information, the corresponding data is retrieved. Thus, if a good match in the past history is found based on the first few maneuvers of the driver along the route, then the driver is determined to be traveling to that destination. Past days and times are compared for this purpose and similar days and times are weighted higher to determine the match. If the vehicle deviates from the best match for the route, alternatives are searched. If no past routes are matched with the present travel, the powertrain controls will default to non-predictive operation.

As will be discussed below with reference to FIG. 2, the past speeds and loads for the identified route are adjusted for present conditions (e.g., weather). The predicted speeds and loads will be used to control and optimize the powertrain to improve the fuel economy and emissions in a manner that will not impact the vehicle's driving performance. That is, the predicted speeds and loads on the powertrain can be used to optimize the shift scheduling of conventional vehicles and the transmission and battery control for HEVs and PHEVs.

Figure 1:
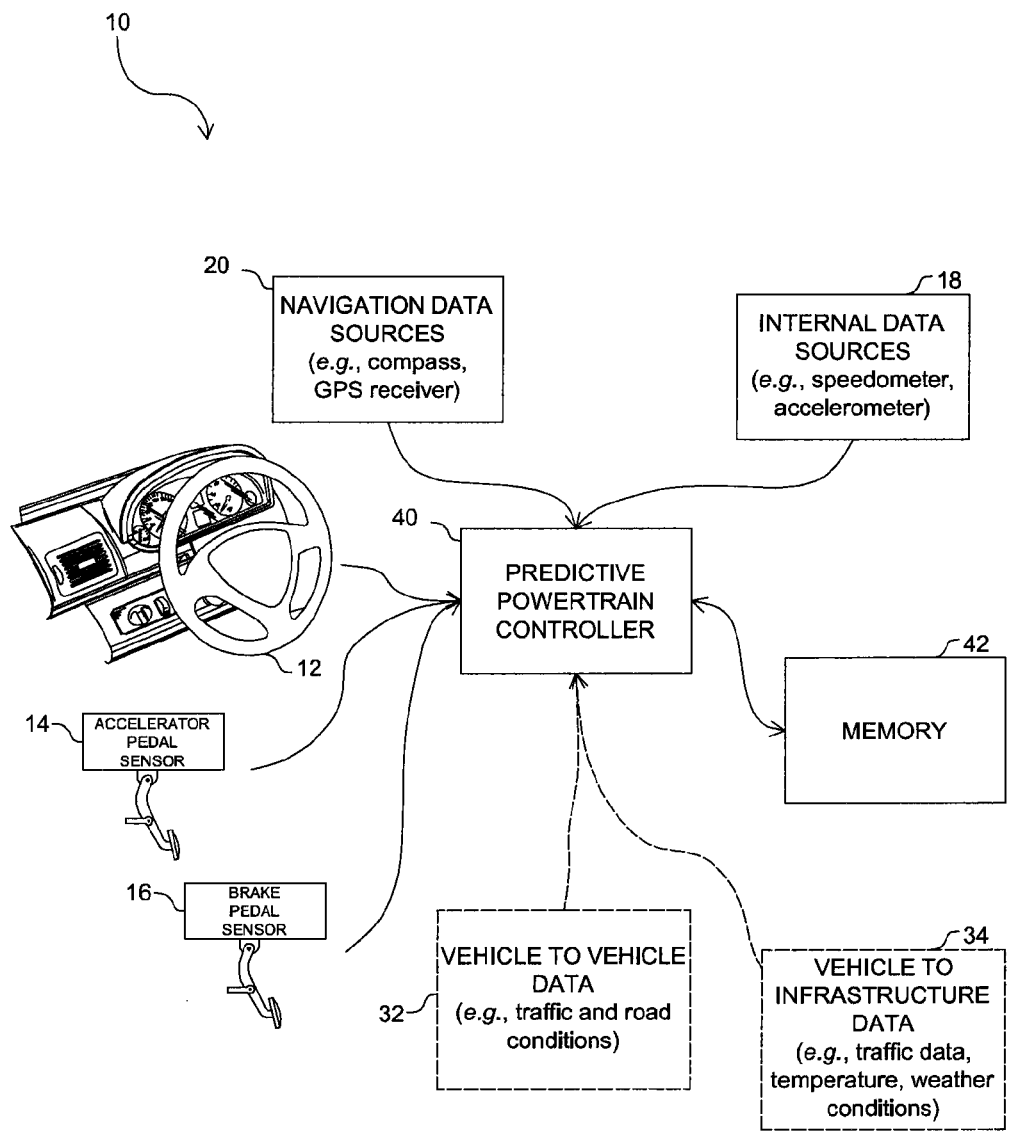
FIG. 1 illustrates a predictive powertrain control system constructed in accordance with an embodiment disclosed herein.

FIG. 1 illustrates a predictive powertrain control system 10 constructed in accordance with an embodiment disclosed herein. The system 10 has a predictive powertrain controller 40, which may be a programmed processor or other programmable controller suitable for performing the method 100 illustrated in FIG. 2 and discussed below in more detail. Associated with the controller 40 is a non-volatile memory 42, which may be part of the controller 40 or a separate component. It should be appreciated that any form of non-volatile memory may be used for memory 42. In addition, the predictive powertrain control programming is stored in the memory 42. It should be appreciated that the functions performed by the controller 40 can also be integrated into the vehicle's powertrain control software, if desired.

As can be seen in FIG. 1, the predictive powertrain controller 40 receives data and signals from various sources within the vehicle and external to the vehicle. Specifically, the controller inputs data from one or more internal data sources 18 (e.g., speedometer, accelerometer) and driver input information from e.g., the steering column 12, accelerator pedal sensor 14 and brake pedal sensor 16. It is desirable for the controller 40 to be connected to one or more navigation data sources 20 (e.g., compass or GPS receiver) and one or more external data sources such as a vehicle to vehicle data source 32 and a vehicle to infrastructure data source 34. The input information/data can include e.g., expected speeds and speed limits (e.g., from vehicle to infrastructure data sources such as smart traffic lights, highway information systems, etc.), weather conditions (e.g., wet, dry, icy, windy, etc. from weather service information input e.g., from GPS, vehicle to vehicle or vehicle to infrastructure data sources) or any other information provided by or transmitted by the various illustrated data sources.

Figure 2:
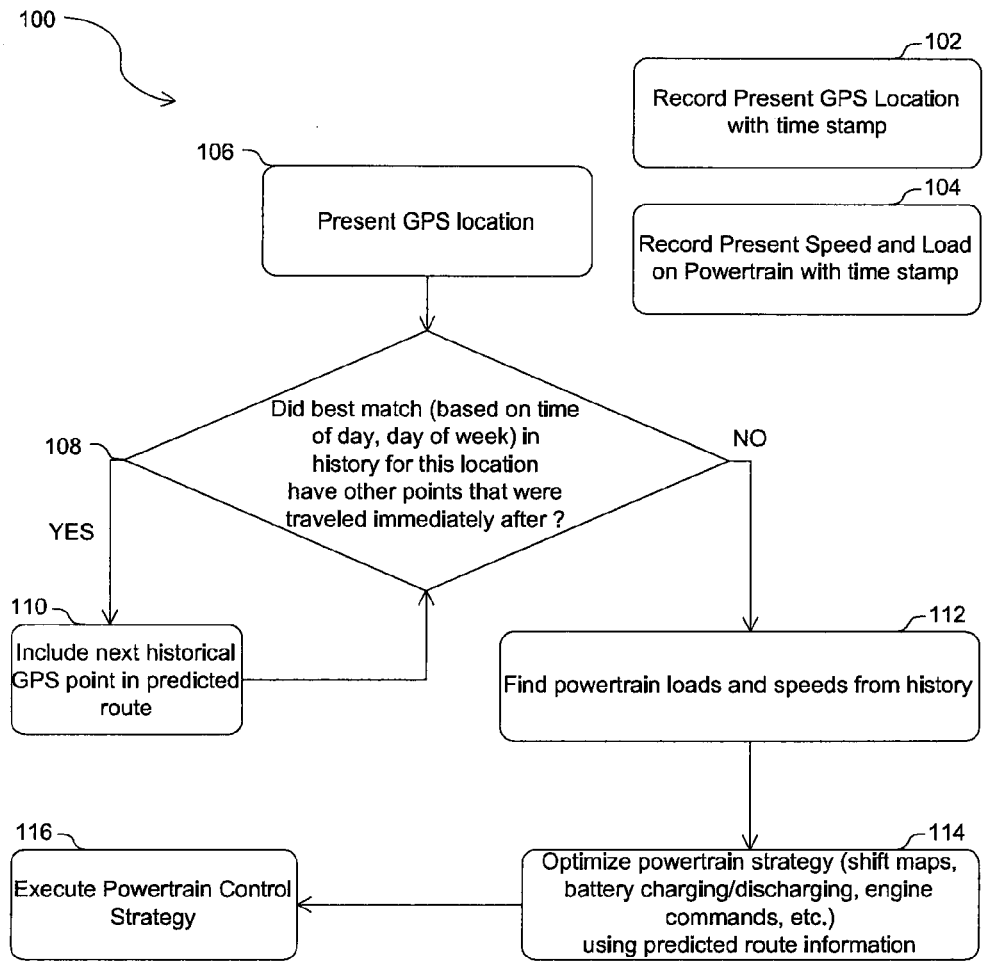
FIG. 2 illustrates in flowchart form a predictive powertrain control method operating in accordance with an embodiment disclosed herein.

FIG. 2 illustrates an example predictive powertrain control method 100 according to the principles discussed herein. The method 100, at step 102, records the present GPS location with a time stamp including the day of week as well as the time of day. At step 104, the present speed and load on the powertrain are recorded with the same time stamp from step 102 (i.e., a time stamp including the day of week as well as the time of day). These steps are periodically performed throughout the trip and are used in the predictive portion of the method 100 as described below in more detail.

The predictive portion of the method 100 begins at step 106 where the present GPS location of the vehicle is determined. It should be appreciated that the location recorded in step 102 may be used and that step 106 may be skipped, if desired. At step 108 a search of the recorded history is made to determine if the current GPS location is associated with another historical GPS point that is typically traveled immediately after the current GPS location. The search looks for a best match based on a matching time of day and day of week. If it is determined that there is another (or more) historical GPS point traveled after the current GPS point, the method 100 includes the next historical GPS point in the current predicted route (step 110) and continues at step 108 to check for another "next" point on the predicted route. Thus, steps 108 and 110 add GPS points to the predicted route based on route information previously stored in the map database that matches the current day and time of day. The route information preferably includes historical battery charging locations, which are also factors for optimizing the powertrain of PHEVs and similar vehicles. As mentioned above, the prediction of battery charging locations can be used to change battery discharging strategy to be more or less aggressive.

If at step 108 it was determined that there is no next GPS point in the stored history that matches the time of day and day of week, the method continues at step 112 where stored powertrain loads and speeds corresponding to the predicted route are retrieved from the stored history. Using the retrieved powertrain loads and speeds, at step 114, an optimized powertrain control strategy is then developed for the type of vehicle. For conventional vehicles, this means that e.g., shift maps for a shifting schedule can be modified. For HEVs and PHEVs, battery charging and discharging scheduling can be modified based on the desired aggressiveness of the schedule. Relevant engine commands needed to implement the new strategy are also developed. The predictive powertrain control strategy is then executed at step 116.

It should be appreciated that the disclosed system 10 and method 100 enhance the real world fuel economy of the vehicle, allowing the vehicle's owner to save money on fuel. Better fuel economy is also beneficial to the environment because less fuel is being consumed and less emissions are entering the atmosphere. The disclosed system 10 and method 100 capitalize on information that is readily available from onboard components and systems already present within the vehicle. Moreover, the system 10 and method 100 do not need a navigation system to operate successfully. As such, the system 10 and method 100 are easily and inexpensively implemented into the vehicle. Moreover, the system 10 and method 100 disclosed herein do not require the driver to enter a route or other information to successfully operate and improve the vehicle's fuel economy.

What is claimed is:

1. A method of controlling a vehicle powertrain, said method comprising using a controller for:
   (1) determining a present location of the vehicle using a GPS;
   (2) predicting a route of travel for the vehicle from the present location based on the current day and time;
   (3) identifying historical GPS points within the predicted route of travel that are traveled after the present location of the vehicle based on matching days and times, the historical GPS points including battery charging locations;
   (4) when all historical GPS points within the predicted route of travel are identified, retrieving historical powertrain loads and speeds from a memory for the predicted route of travel and the identified historical GPS points;

(5) optimizing a powertrain operation of the vehicle for the predicted route of travel and the identified historical GPS points based on the retrieved historical powertrain loads and speeds; and (6) updating the present location of the vehicle and repeating steps (2) through (6).

2. The method of claim 1, wherein the optimized powertrain operation comprises one of shift scheduling and battery control.

3. The method of claim 1, wherein determining the present location of the vehicle further comprises recording the present location with a time stamp.

4. The method of claim 1, further comprising recording present powertrain speed and load with a time stamp to be used as part of the powertrain's history.

5. A powertrain apparatus for a vehicle, said apparatus comprising:

a controller adapted to:

(1) determine a present location of the vehicle;

(2) predict a route of travel for the vehicle from the present location based on the current day and time;

(3) identify historical GPS points within the predicted route of travel that are traveled after the present location of the vehicle based on matching days and times, the historical GPS points including battery charging locations;

(4) when all historical GPS points within the predicted route of travel are identified, retrieve historical powertrain loads and speeds for the predicted route of travel and the identified historical GPS points;

(5) optimize a powertrain operation of the vehicle for the predicted route of travel and the identified historical GPS points based on the retrieved historical powertrain loads and speeds; and (6) update the present location of the vehicle and repeat steps (2) through (6).

6. The apparatus of claim 5, wherein the optimized powertrain operation comprises one of shift scheduling and battery control.

7. The apparatus of claim 5, wherein the controller records the present location with a time stamp.

8. The apparatus of claim 5, wherein the present location is a GPS location.

9. The apparatus of claim 5, wherein the controller further records present powertrain speed and load with a time stamp to be used as part of the powertrain's history.

* * * * *